May 2, 1933.  A. CUNNINGHAM  1,906,947

STEAM CARGO HOIST

Filed June 25, 1930  4 Sheets-Sheet 1

INVENTOR
Allan Cunningham
BY
*[signature]*
ATTORNEY

May 2, 1933.  A. CUNNINGHAM  1,906,947
STEAM CARGO HOIST
Filed June 25, 1930    4 Sheets-Sheet 2
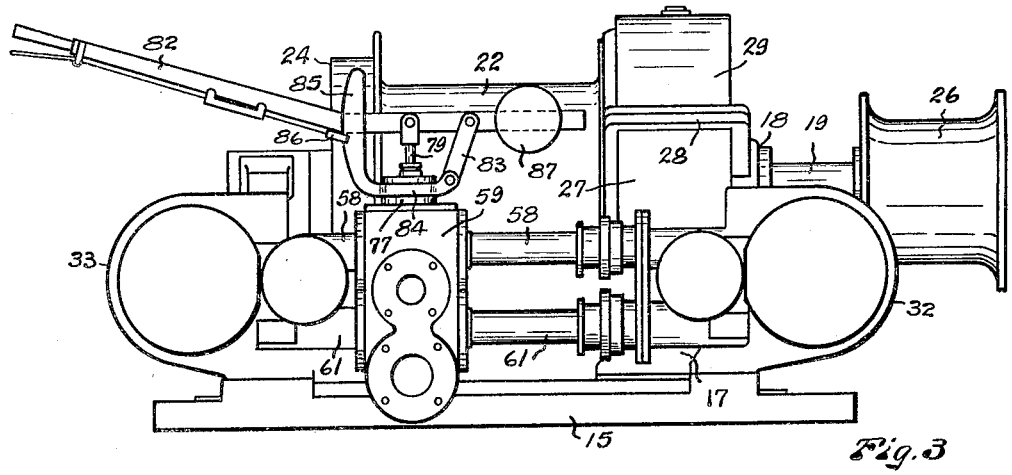
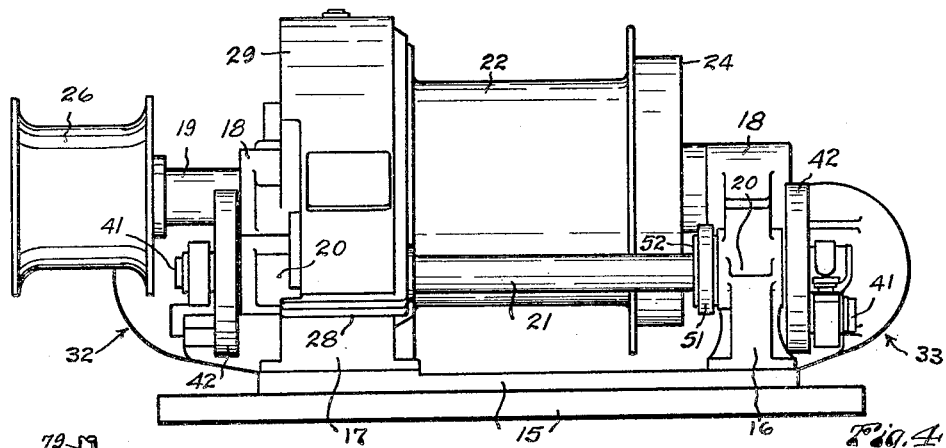
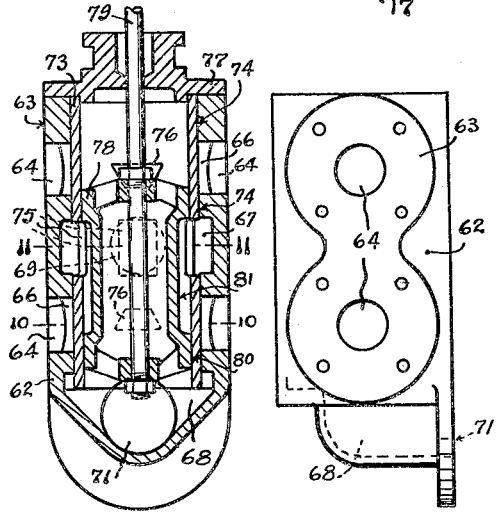
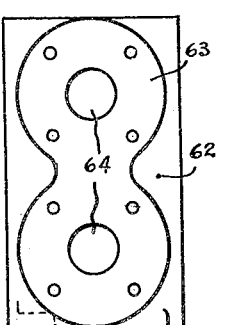
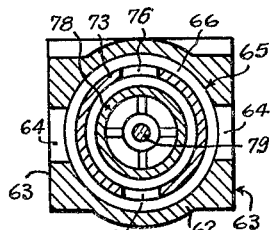
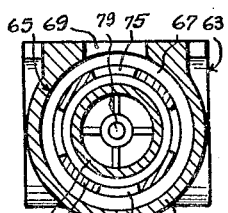
INVENTOR
Allan Cunningham
BY
ATTORNEY May 2, 1933.  A. CUNNINGHAM  1,906,947
STEAM CARGO HOIST
Filed June 25, 1930   4 Sheets-Sheet 3

INVENTOR
Allan Cunningham
BY
G. Wright Arnold
ATTORNEY

Patented May 2, 1933

1,906,947

UNITED STATES PATENT OFFICE

ALLAN CUNNINGHAM, OF SEATTLE, WASHINGTON

STEAM CARGO HOIST

Application filed June 25, 1930. Serial No. 463,789.

My invention relates to steam cargo hoists and the primary object of my invention is to provide a steam cargo hoist which is quiet in operation, and in which vibration and wear are reduced to a minimum and the efficiency and durability of the hoist are greatly increased.

Steam cargo hoists of the form heretofore in common use are noisy in operation and are subject to considerable vibration. These objectionable characteristics grow more pronounced with use and wear, the noise being unpleasant and tending to lower the efficiency of persons working around the hoist and the vibration tending to increase wear and lower the working efficiency of the hoist.

The primary object of my invention is to provide a steam cargo hoist which will overcome these undesirable characteristics and reduce noise and vibration to a minimum and at the same time increase the working efficiency of the hoist. I accomplish this by providing a steam cargo hoist having a slow piston and crank shaft speed in proportion to the peripheral speed of the drum on which the hoisting cable operates, and in which the speed reduction gears between the engine and the drum have a relatively low gear ratio and are of moderate pitch and accurate construction and have relatively wide contacting surfaces and are completely housed and run in a bath of oil whereby noise and wear are reduced to a minimum. Vibration and noise are further reduced by accurately balancing all of the moving parts to as great an extent as possible and by providing large long bearings which insure moderate bearing pressures.

Other objects of the invention are to provide a steam cargo hoist of novel and efficient construction in which the hoisting drum mechanism and the engines are all rigidly secured together and mounted on a single base, and in which reversing and control valve mechanism is mounted between the two engine cylinders for controlling the speed and reversal of the moving parts and reversal of rotation of the drum.

The importance and necessity of a silent steam cargo hoist or winch is manifest in view of the fact that many of the passenger ships now carry considerable freight. The electric hoist or winch at the present time has this particular virtue of silent operation. However, the installation of such electric hoists is more expensive. In a specific instance on a combined passenger and freight vessel carrying thirty-two hoists, it was found that the noise of the hoists was very undesirable to the passengers and a more quiet system of hoists was sought. It was found that the installation of thirty-two electrically operated hoists would involve an expenditure of $250,000, but instead, the present invention was actually installed at a cost of only some $32,000.

To attain the silent characteristics of the hoist embodied in the present invention involves the following features:

(1) Reducing the circular pitch of the gears and completely enclosing said gears and placing them in an oil bath. The ordinary pitch or distance between the centers of the teeth of the gears of a hoist of similar capacity to my invention is one and one-half (1½) inches or more, which is the standard design and necessitates a deep tooth, whereas my present invention employs a pitch of only five eighths (⅝) of an inch with a tooth of less than one-half the height of the ordinary tooth, and an increase in the width of the face of the gear.

All former hoists involved the securing of the gear directly to the flange of the hoisting drum. Applicant has separated these two members and has keyed the gear to the main drum shaft, thus separating the main gear from the adjacent drum flange, leaving space for a housing wall between the main gear and the drum and making it possible to completely house the gears and operate them in an oil bath. In making provision for the oil bath, considerable change in structure was necessary in order to provide for compactness because extreme economy of every square foot of deck space must be observed. Furthermore, to increase compactness, it will be noticed that the invention involves the placing of the eccentric adjacent to the gear on the inside within the housing providing the oil bath.

(2) A second feature that provides for the successful operation of the present invention comprises increasing the piston displacement and reducing the piston speed, thus providing a smoother torque curve than obtains in any present hoist or winch mechanism. For example, my piston may be ten (10) inches in diameter with a ten (10) inch stroke and slow piston speed, and I find a successful gear ratio to be three and one-half (3½) to one (1). At first, those skilled in the art stated that such speed was entirely too slow but upon actual test under commercial operation it was found that the present invention, by reason of its smooth torque curve permitted in one hour, sixty-three (63) round strips of the cargo sling as against forty (40) trips with the ordinary standard hoist having a gear ratio of five (5) to one (1) and a piston of eight (8) inches in diameter with a ten (10) inch stroke and a higher piston speed.

(3) Another feature involves the question of balance of all the parts. The drum and the gear of the present invention are carefully balanced, statically and dynamically, and all bearing areas have been increased over all standard designs.

The above mentioned general objects of my invention together with others inherent in the same, are attained by the mechanism, illustrated in the following drawings, the same being a preferred exemplary form of embodiment of my invention, throughout which drawings like reference numerals indicate like parts:

Fig. 3 is an end elevation of the end of the cargo hoist on which the steam cylinders are mounted;

Fig. 4 is an end elevation of the other end of the hoist on which the winding drums are mounted;

Fig. 8 is a detached side elevation of the reversing valve housing;

Figure 12:
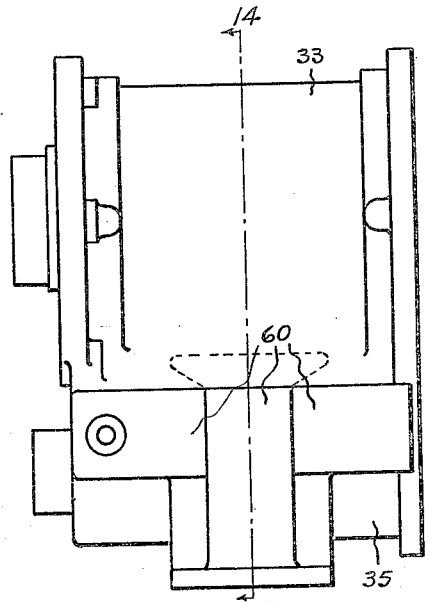
Figure 14:
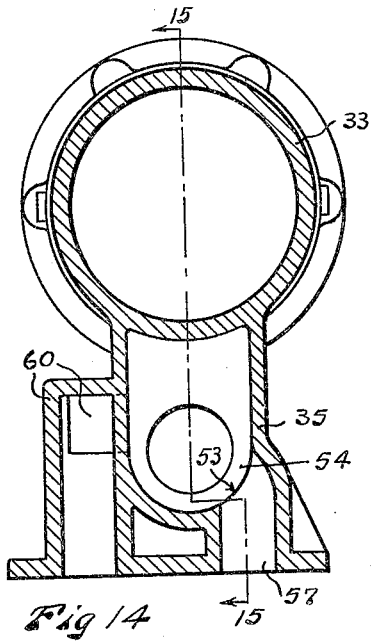
Figure 13:
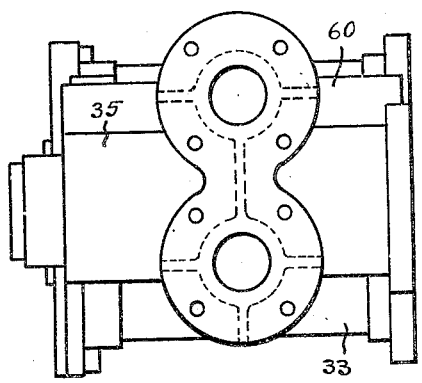
Figure 15:
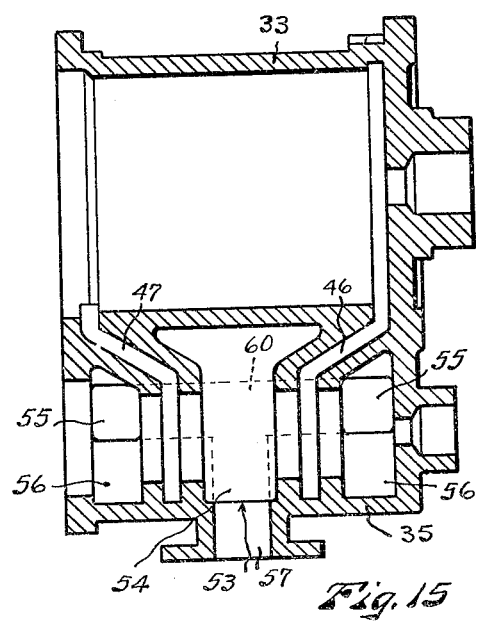

Fig. 9 is a vertical mid-section through the reversing valve showing the liner and valve core in assembled relation within the valve housing Figs. 10 and 11 are cross sections through the reversing valve substantially on broken lines 10—10 and 11—11 respectively of Fig. 9, showing the arrangement of the steam intake and exhaust ports and passageways;

Fig. 12 is an elevation of the bottom side of a cylinder housing;

Fig. 13 is a side elevation of the same;

Fig. 14 is a sectional view through said cylinder housing substantially on broken line 14—14 of Fig. 12;

Fig. 15 is another sectional view through said cylinder housing substantially on broken line 15—15 of Fig. 14.

The drawings show a steam cargo hoist embodying a base frame 15 whereon are mounted two upright frame members 16 and 17 which support suitable bearings 18 for a main drum shaft 19, and other suitable bearings 20 for a driving shaft 21. The main drum shaft 19 has a main winding drum 22 rigidly secured thereto as by a key 23. A suitable brake drum 24 is provided at one end of the main winding drum and is arranged to be engaged by a brake band 25 which may be operated by suitable mechanism, not shown. The shaft 19 projects beyond the bearing 18 at one end and has a small winding drum or gypsy 26 secured thereon. If desired, the other end of the shaft 19 may be extended and a second gypsy provided at the opposite side of the machine.

Figure 2:
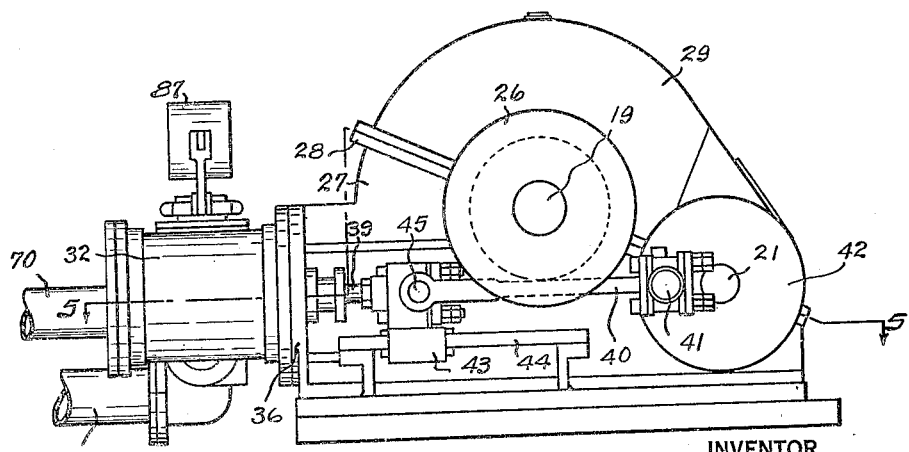
Fig. 2 is a side elevation of the same.

The frame bracket 17 at one side of the machine is shaped to form the lower half of a gear housing 27, the upper edges of which are inclined and flanged as shown at 28 in Fig. 2, and are disposed in the common plane of the axes of the shafts 19 and 21. One side 27' of the housing 27 extends between the end of the drum and an adjacent gearwheel 30 and has oil ring means 89 which operate in contact with the hub of the drum 22. The lower half of the bearings 18 and 20 are formed in this lower bracket or housing part 17 and the upper half of said bearings are formed in the lower side of a gear housing cover 29, which rests upon and is secured to the housing part 17.

The shafts 19 and 21 both extend through the gear housing 27 and are connected for driving purposes by a large gearwheel 30 which is fixed on the drum shaft 19 and a smaller gearwheel 31 which is fixed on the crank shaft. Both of these gearwheels have wide faces and are of moderate pitch and are accurately cut and balanced and run in a bath of oil so that wear on these gears is reduced to a minimum and they will operate very quietly. The careful construction and complete housing of these gears is important in securing quiet and efficient operation of the hoist, and the ratio of the gears is important when considered in relation to the speed of the engine, it being important to have the gear ratio high enough to secure the desired drum speed at relatively slow piston speed, thus making it possible to keep down vibration.

Figure 1:
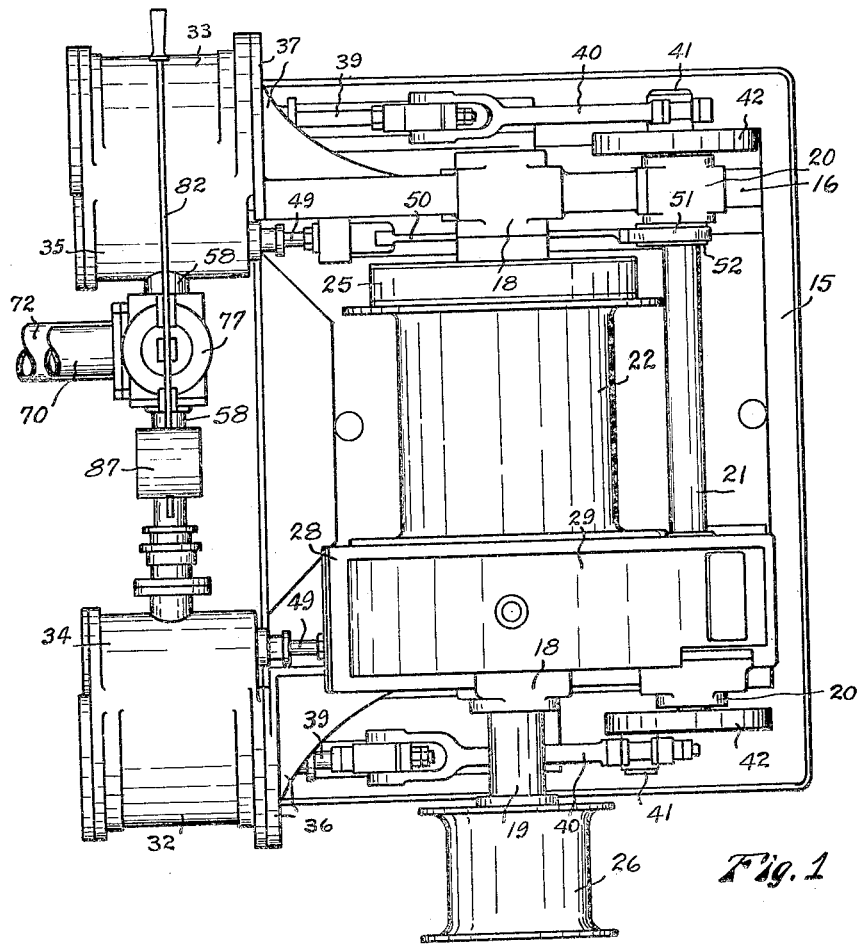
Figure 1 is a plan view of a steam cargo hoist constructed in accordance with my invention.
Figure 5:
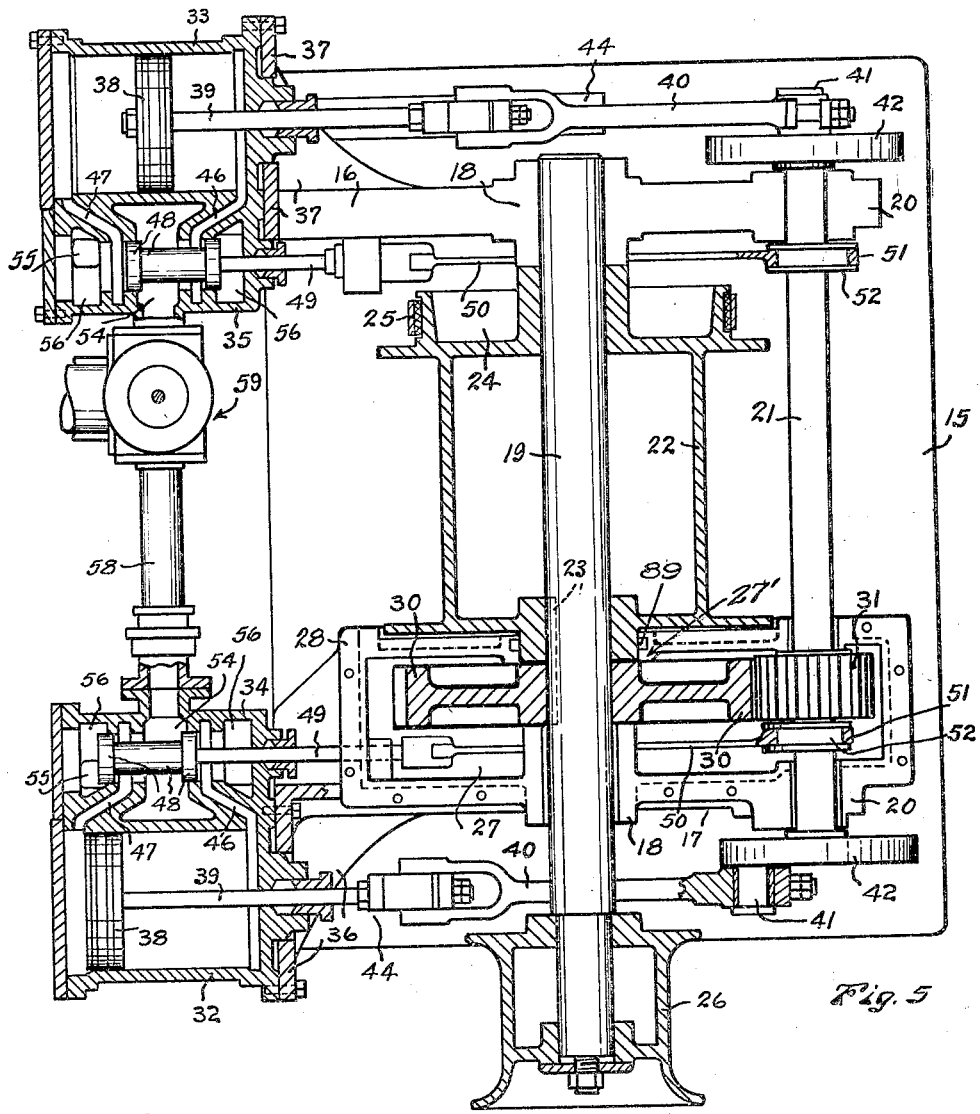
Fig. 5 is a sectional view of my steam cargo hoist on a larger scale substantially on broken line 5—5 of Fig. 2, certain parts being shown in plan.
Figure 6:
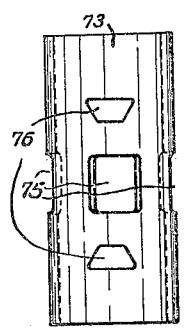
Fig. 6 is a detached elevation of a valve liner used in a control and reversing valve which is embodied in my invention.
Figure 7:
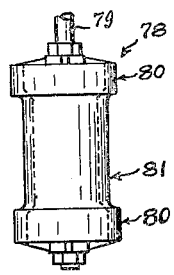
Fig. 7 is a detached elevation of a valve core adapted to operate within the liner shown in Fig. 6.

The means for driving the shaft 21 is in the nature of a steam engine embodying two steam cylinders 32 and 33 having valve chambers 34 and 35, respectively, cast integrally therewith. These cylinders 32 and 33 are secured to rigid angle brackets 36 and 37, respectively, which are provided on the respective upright frame members 17 and 16, see Figs. 1 and 5. This affords a rigid mounting for the cylinders 32 and 33 and connects them directly with the supporting structure of the parts they drive.

Pistons 38 are provided in the cylinders 32 and 33 and are connected by piston rods 39 and connecting rods 40 with crank pins 41 on crank drives 42 which are provided on opposite ends of the driving shaft 21. A cross head 43 guided on a straight track bar 44 is provided at the location of the pivot 45 which connects each piston rod 39 with its connecting rod 40.

The valve chambers 34 and 35 are connected by ports 46 and 47 with opposite ends of their respective cylinders and said valve chambers have slide valves 48 therein which are connected by valve rods 49, valve connecting rods 50 and bearing members 51 with eccentric discs 52 on the driving shaft 21, said eccentric discs thus serving to control the movement of the slide valves 48 by which the admission and exhaust of the cylinders 32 and 33 is controlled. A port 53 is connected with the medial portion 54 of each valve chamber and other ports 55 are connected with the end portions 56 of each valve chamber. Each port 53 leads into a passageway 57 which is connected by an upper pipe 58 with a reversing valve, designated generally at 59. The two end ports 55 of each cylinder open into a common manifold passageway 60 which is connected by lower conduit pipes 61 with the reversing valve 59. The arrangement of these ports is such that live steam may be admitted either through the central port 53 or through the end ports 55 and, at the same time, used steam may exhaust through the other port or ports, the arrangement for the two cylinders 32 and 33 being in duplicate.

The reversing valve 59 embodies an outer valve housing 62, Figs. 7, 8, 9, 10 and 11, having flat faces 63 on two opposite sides for connection with the upper and lower pipes 58 and 61 and having openings 64 which communicate with said pipes and with an upright internal valve bore 65 of said valve housing. The bore 65 is preferably cored to afford annular internal spaces 66 of larger diameter at the locations of the openings 64 and is further cored to afford another annular space 67 of larger diameter midway between the spaces 66 and is still further cored to afford an exhaust space 68 at the bottom of the valve housing 62. The space 67 is connected by an opening 69 with a steam inlet pipe 70 and the exhaust space 68 is connected by an opening 71 with an exhaust pipe 72. A tubular valve liner 73 is provided within the valve bore 65, the external walls of said liner being accurately ground for close contact with accurately finished portions 74 in the walls of said bore 65. A plurality of ports 75 are provided in the walls of the liner 73 for registration with the annular steam intake space 67 and other ports 76 are provided in the walls of said liner for registration with the spaces 66 which communicate with the pipes 58 and 61. The liner 73 seats in the bottom of the housing 62 and is held in place by a cap 77 which is secured to the top of the housing.

A valve core 78 is reciprocably disposed within the liner 73 and is connected with an operating rod 79 by which it may be moved vertically. The valve core 78 has external portions 80 of larger diameter near its ends which are ground to fit snugly within the liner 73 and said core 78 has a medial portion 81 of smaller diameter between the larger portions 80. The center of said valve core is hollow and open at both ends as shown in the drawings. The valve operating rod 79 extends upwardly through a stuffing box in the cap 77 and is connected with a reversing lever 82 which is supported by a link 83 from a bracket 84 which is secured to the top of the valve housing 62. A quadrant 85 which may be a rigid part of the bracket 84 extends upwardly from said bracket and serves as a means over which a catch member 86 on the reversing lever 82 may move.

The forward end of the lever 82 extends beyond the link 83 and has a counterweight 87 provided thereon.

In the operation of this reversing valve, when the valve core 78 is in the lowermost position as shown in Fig. 9, the smaller body portion 81 of said core overlaps and connects the lower end port 76 and the steam intake ports 75 in the liner thus permitting steam to flow to the lower pipes 61, and, at the same time uncovering the upper port 76 and permitting steam to exhaust from the upper pipes 58 through this port and down through the valve core 78 and exhaust space 68 to the exhaust pipe 72. If the valve core 78 is moved from the lower, wide open, position upwardly both of the ports 76 will begin to be closed by overlapping of the valve core portions 80 and the inlet and exhaust ports will be gradually closed until the core reaches a position where said ports are fully closed. Further upward movement of the valve core will result in the upper port 76 and pipe 58 being opened to the intake of steam and the lower port 76 and pipe 61 being opened to exhaust thus providing for reversing the engine.

In the operation of this steam cargo hoist the intake of steam under pressure and the exhaust of the used steam is controlled by regulating the reversing valve 59. This steam drives the pistons at moderate speed and thus rotates the drum 22 whereon a main hoisting cable, not shown, may be wound. The only gears employed in the drive are the two wide face moderate pitch gears 30 and 31 running in a bath of oil and completely housed. The smaller of these gears 31 is of relatively large size and the gears are of moderate pitch and accurately made thus rendering them substantially noiseless in operation. A gear ratio between three to one and four to one is preferably employed. The valve ports are arranged and dimensioned so that the speed of the engine may be easily controlled and can never be high. In practice I prefer not to allow a piston speed of more than four hundred fifty feet per minute. The cylinders are relatively large and the drum 22 is of large diameter to keep down the speed of the engine and yet give sufficient speed to the cable which operates on said drum to satisfy all requirements. The result of this combination of slow speed engine and moderate pitch low ratio gear is to produce a hoist that is highly efficient and substantially noiseless in operation. The relatively large long bearings insure moderate bearing pressures and said bearings will withstand a great amount of wear without becoming noisy.

It will be noted that the eccentric disc 52 adjacent the gearwheels 30 and 31 is disposed within the gear housing, the eccentric rod 49 extending into said gear housing. This makes for compactness of construction and insures efficient lubrication of this eccentric without attention.

Obviously, changes may be made in the form, dimensions and arrangement of the parts of my invention, without departing from the principle thereof, the above setting forth only a preferred form of embodiment.

I claim:

1. In a relatively noiseless steam cargo hoist a drum shaft; a drum on said drum shaft; a driving shaft; bearings for both said shafts; a larger and a smaller gearwheel secured on said drum shaft and said driving shaft respectively; an oil tight housing completely enclosing said gearwheels, one wall of said housing extending between said larger gearwheel and the end of said drum; oil ring seal means in said side of said housing, which housing extends between said larger gear wheel and the end of said drum; and steam engine means having a driving connection with said driving shaft.

2. In a relatively noiseless steam cargo hoist a drum shaft; a drum on said drum shaft; a driving shaft; bearings for both said shafts; a larger and a smaller gearwheel secured on said drum shaft and said driving shaft respectively; an oil tight housing completely enclosing said gearwheels, one wall of said housing extending between said larger gearwheel and the end of said drum; oil ring seal means in said side of said housing and engaging with the hub portion of said drum; and steam engine means having a driving connection with said driving shaft.

In witness whereof, I hereunto subscribe my name this 21st day of June, 1930.

ALLAN CUNNINGHAM.